US009369828B2

(12) United States Patent
Hohl

(10) Patent No.: US 9,369,828 B2
(45) Date of Patent: Jun. 14, 2016

(54) RADIO NETWORK WITH A LOW POWER CONSUMPTION AND METHOD FOR OPERATING SUCH A RADIO NETWORK

(71) Applicant: Landis+Gyr AG, Zug (CH)

(72) Inventor: Heinz Hohl, Baar (CH)

(73) Assignee: Landis+Gyr, AG, Zug (CH)

( * ) Notice: Subject to any disclaimer, the term of this patent is extended or adjusted under 35 U.S.C. 154(b) by 0 days.

(21) Appl. No.: 14/385,443

(22) PCT Filed: Mar. 11, 2013

(86) PCT No.: PCT/EP2013/054852
§ 371 (c)(1),
(2) Date: Sep. 15, 2014

(87) PCT Pub. No.: WO2013/135618
PCT Pub. Date: Sep. 19, 2013

(65) Prior Publication Data
US 2015/0031305 A1 Jan. 29, 2015

(30) Foreign Application Priority Data
Mar. 14, 2012 (EP) .................................... 12001729

(51) Int. Cl.
*H04B 7/00* (2006.01)
*H04W 4/00* (2009.01)
*H04L 29/08* (2006.01)
*H04B 1/68* (2006.01)
*H04W 76/02* (2009.01)
*H04W 80/00* (2009.01)

(52) U.S. Cl.
CPC ................. *H04W 4/008* (2013.01); *H04B 1/68* (2013.01); *H04L 29/08009* (2013.01); *H04L 69/322* (2013.01); *H04W 76/023* (2013.01); *H04W 80/00* (2013.01)

(58) Field of Classification Search
CPC ............ H04W 4/008; H04L 29/08009; H04L 69/322; H04B 1/68
USPC ........................................................ 455/41.2
See application file for complete search history.

(56) References Cited

U.S. PATENT DOCUMENTS

| 2006/0079280 A1 | 4/2006 | LaPerch |
| 2006/0187961 A1 | 8/2006 | Kai |
| 2009/0073983 A1 | 3/2009 | Kim |

OTHER PUBLICATIONS

International Search Report corresponding to PCT Application No. PCT/EP2013/054852, mailed Jun. 20, 2013 (German and English language document) (4 pages).
Ming-Whei Feng et al., Wireless Sensor Network and Sensor Fusion Technology for Ubiquitous Smart Living Space Applications (Invited Paper), Universal Communication, Second International Symposium on, IEEE,Dec. 15, 2008, Piscataway, NJ, USA.
Miroslav Sveda et al., ZigBee-to-Internet Interconnection Architectures, Systems, Second International Conference on, IEEE, Apr. 1, 2007.

*Primary Examiner* — Eugene Yun
(74) *Attorney, Agent, or Firm* — Maginot, Moore & Beck LLP

(57) ABSTRACT

In a radio network having a low power consumption—a so-called Low Rate Wireless Personal Area Network (LR-WPAN)—a first network unit is arranged above a first physical transmission unit and a first data link unit connected thereto, a first network link having a first switch having echo suppression based on the Low Rate Wireless Personal Area Network being arranged between the first data link unit and the first network unit, and being connected to a second network link having a second switch having echo suppression based on the Low Rate Wireless Personal Area Network via a subsequent connection structure. In this arrangement, this connection structure connects a second network unit to the first network unit for the purpose of communication based on the Low Rate Wireless Personal Area Network.

10 Claims, 5 Drawing Sheets

RADIO NETWORK WITH A LOW POWER CONSUMPTION AND METHOD FOR OPERATING SUCH A RADIO NETWORK

This application is a 35 U.S.C. §371 National Stage Application of PCT/EP2013/054852, filed on Mar. 11, 2013, which claims the benefit of priority to Serial No. EP 12 001 729.8, filed on Mar. 14, 2012 in Europe, the disclosures of which are incorporated herein by reference in their entirety.

The present invention falls into the field of networks; it relates to a radio network having a low power consumption, namely a Low Rate Wireless Personal Area Network (LR-WPAN), and to a method for operating such a radio network.

BACKGROUND

Radio networks having a low power consumption are known in conjunction with the IEEE 802.15.4 Standard which is specialized for so-called "Low Rate Wireless Personal Area Networks" (Low Rate WPAN). These radio networks operate with low data transmission rates, on the one hand, and, on the other hand, have the special advantage of a long battery life of the devices or objects which are equipped with this radio network; the battery life can last up to some years, which correspondingly reduces the maintenance expenditure.na Radio networks according to IEEE 802.15.4 comprise essentially a physical transmission unit (Physical Layer, PHY), a data link unit (Medium Access Layer, MAC) and a proprietary network unit (Network Layer). Such network units are known, for example, by the designations 6IoWPAN, ZigBee, WirelessHART or MiWi, this list of network units named not being exhaustive.

All network units have in common that they have transmission ranges of some 10 meters inside buildings, the range being reducible by reinforced concrete walls, interferences, disturbances or by device installations in metallic control cabinets. As a rule, such problems are eliminated by additional installations of routers or network coordinators which, although it increases the number of network hops of objects communicating with one another, can enable communication to be carried out in the first place, on the other hand.

It is a fact that such additional installations of routers or network coordinators in buildings having numerous storeys or in very large buildings appear to be complex, not only with respect to the hardware installed and associated with costs, but also in the numerous—and thus time-consuming—network hops between communicating devices.

Users of the radio networks having a low power consumption, being discussed here, currently bow to the increased installation effort in order to be able to utilize the advantages of such radio networks which are otherwise appreciated.

Thus, it is described, for example in "ZigBee-to-Internet Interconnection Architectures", SYSTEMS, 2007, ICONS '07, SECOND INTERNATIONAL CONFERENCE ON, IEEE, PI, 1 Apr. 2007 (Apr. 1, 2007), ISBN: 978-0-7695-2807-6, by MIROSLAV SVEDA ET AL, how the "range" of a ZigBee network, which is fundamentally based on radio links, can be extended in a hard-wired fashion by a TCP/IP bridge. Although such a TCP/IP bridge then provides for communication between objects in the ZigBee network which no longer have a radio link between themselves, this advantage is purchased with correspondingly comparatively great hardware expenditure compared with the known ZigBEE hardware. In the publication "Wireless Sensor Network and Sensor Fusion Technology for Ubiquitous Smart Living Space Applications (Invited Paper)", UNIVERSAL COMMUNICATION, 2008, ISUC '08, SECOND INTERNATIONAL SYMPOSIUM ON, IEEE, Piscataway, N.J., USA, 15 Dec. 2008 (Dec. 12, 2008), ISBN: 978-0-7695-3433-6, by MING-WHEI FENG ET AL., a quite similar system jump between a ZigBee radio network and a TCP/IP bridge is illuminated.

SUMMARY

The disclosure develops a radio network having a low power consumption, a so-called Low Rate Wireless Personal Area Network (LR-WPAN) with the aim that the limited transmission range, described above, within a ZigBee network can be extended in a simple manner and, in this context, the numerous additional installation of routers or network coordinators becomes correspondingly unnecessary; the disclosure also develops a method for operating such a radio network with the aim that communication between devices can take place with the least possible network hops.

An exemplary feature of the radio network having a low power consumption is that a first physical transmission unit (Physical Layer) and a first data link unit (Medium Access Layer) connected thereto are effectively connected to a first network unit, a first network link being connected to a second network link via a subsequent connection structure on the basis of a Low Rate Wireless Personal Area Network between the first data link unit and the first network unit in order to connect a second network unit to the first network unit for the purpose of communication based on a Low Rate Wireless Personal Area Network; by means of the connection structure according to the invention and the network link, two network units which otherwise are not within radio range of one another are thus directly connected in a simple manner and thus form an extended network structure, all functions in this extended network structure behaving identically to those in a pure network having a complete radio coverage.

Objects within a Low Rate Wireless Personal Area Network (LR-WPAN) can now be connected advantageously without a common radio link by means of the connection structure and the network links on the basis of the Low Rate Wireless Personal Area Network without having to utilize a multiplicity of conventional routers or network coordinators; in this arrangement, the connection via the connection structure is virtually independent of its length and a data transfer via the connection structure only needs about the same time as two network hops between objects having a radio link.

The connection structure can be designed advantageously bidirectionally as a wire link, as a radio link or as an optical fiber link, an optical fiber link—and of these especially a plastic optical fiber—being of the greatest advantage. This is because plastic optical fibers (POE) are inexpensive and can be installed using simple means; in addition, optical fiber links can be installed directly next to electrical power lines, according to the usual installation rules for electrical appliances, since no electrical faults or disturbances can occur between them.

For domestic installations, the so-called ZigBee Standard (IEEE 802.15.4) has become established for the network units, by means of which power meters installed in a cellar can communicate, for example, with display devices or consumer devices in each individual apartment of a building.

An exemplary feature of a method for operating a radio network having a low power consumption is that a first physical transmission unit and a first data link unit connected thereto are connected to a first network unit and, between this first data link unit and the first network unit, a first network link communicates with a second network link via a subsequent connection structure, by means of which second network link a second network unit is connected to the first network unit for the purpose of communication based on a Low Rate Wireless Personal Area Network.

The first and the second network link advantageously have a first and a second management unit, respectively, which exchange address data based on the Low Rate Wireless Personal Area Network for coupling the network units.

BRIEF DESCRIPTION OF THE DRAWINGS

In the text which follows, the invention is explained by way of example with reference to figures. In principle, identical objects are designated by identical reference symbols in the figures. It is pointed out at this point that the figures have standard interface connections between individual units which are based on the IEEE 802.15.4 Standard and, in the text which follows, are assumed to be known without further explanation. Purely diagrammatically.

DETAILED DESCRIPTION

Figure 1:
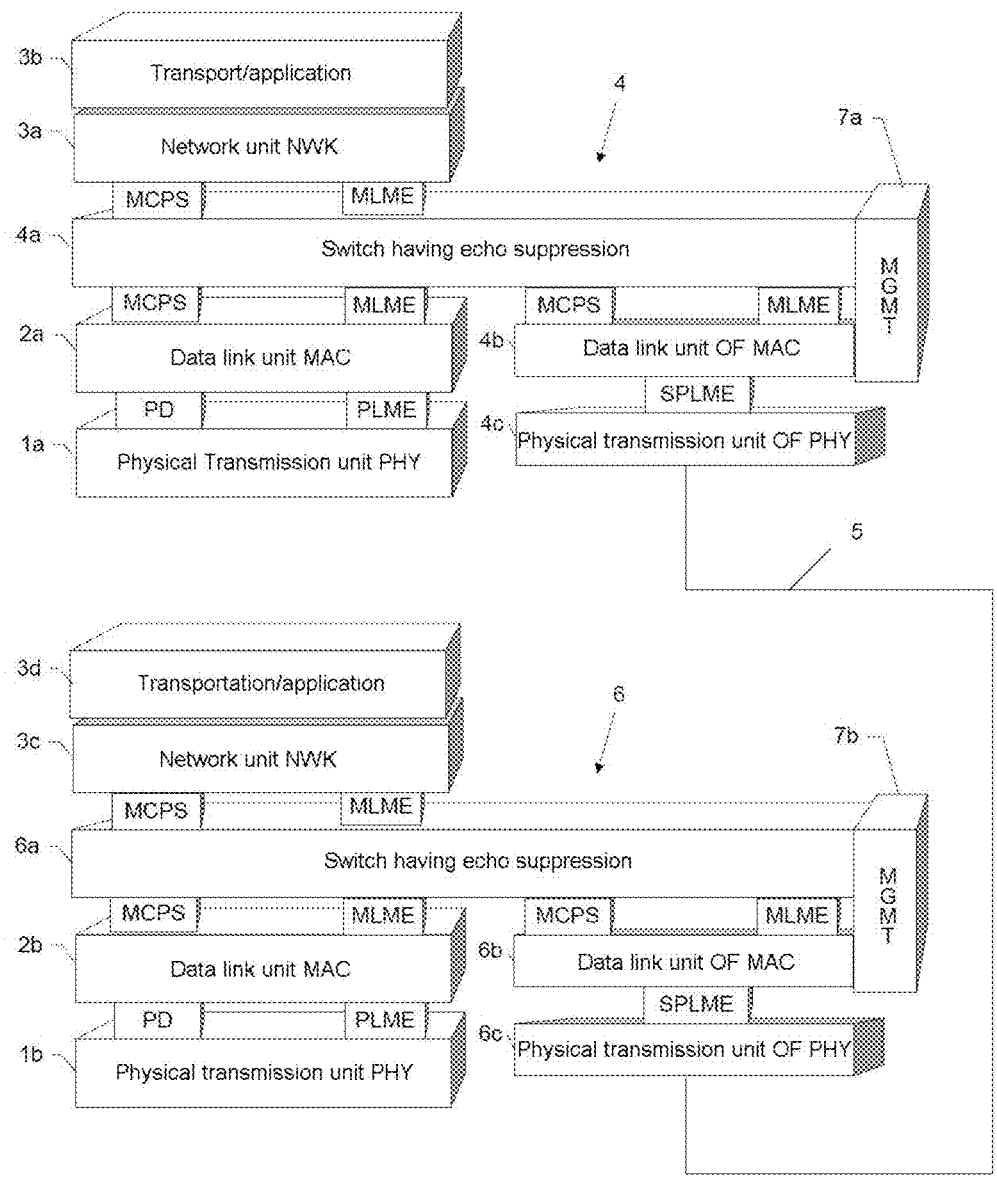
FIG. 1 shows by means of a block diagram the essential functional units of a radio network according to the invention based on a Low Rate Wireless Personal Area Network comprising an optical fiber as connection structure between two network units (Network Layer)

FIG. 1 shows by means of a block diagram the radio network having a low power consumption according to the invention (Low Rate Wireless Personal Area Network), a first physical transmission unit 1a (Physical Layer, PHY), a first data link unit 2a (Medium Access Layer, MAC) and a first network unit 3a (Network Layer) being effectively connected to one another according to the IEEE 802.15.4 Standard for such networks. At this point "network unit" comprises any possible embodiment of such units, only the standards according to 6IoWPAN, ZigBee, WirelessHART or MiWi being mentioned—not exhaustively—by name.

The first physical transmission unit 1a, the first data link unit 2a and the network unit 3a are connected to one another via the known interfaces PD-SAP, PLME-SAP, MCPS-SAP and MLME-SAP, which will not be explained in greater detail here.

According to the invention, a first network link 4, which comprises a first switch having echo suppression 4a, a second data link unit 4b (OF MAC) and a second physical transmission unit 4c (OF PHY), is installed between the first data link unit 2a and the first network unit 3a. The second physical transmission unit 4c shown here is designed for communication based on a Low Rate Wireless Personal Area Network via an optical fiber (OF). Apart from the known interfaces MCPS-SAP and MLME-SAP, the first switch having echo suppression 4a and the second data link unit 4b are connected to one another via a first management unit 7a. Furthermore, the known interface SPLME-SAP connects the second data link unit 4b to the second physical transmission unit 4c.

Furthermore, FIG. 1 shows a fourth physical transmission unit 1b (Physical Layer, PHY) and a fourth data link unit 2b (Medium Access Layer, MAC) which are effectively connected to a second network unit 3c (network layer). Here, too, the fourth physical transmission unit 1b, the fourth data link unit 2b and the second network unit 3c are connected to one another via the known interfaces PD-SAP, PLME-SAP, MCPS-SAP and MLME-SAP.

According to the invention, a second network link 6 which comprises a second switch having echo suppression 6a, a third data link unit 6b (OF MAC) and a third physical transmission unit 6c (OF PHY) is installed between the fourth data link unit 2b and the second network unit 3b, here, too. The third physical transmission unit 6c shown here is designed for communication based on a Low Rate Wireless Personal Area Network via an optical fiber (OF). Apart from the known interfaces MCPS-SAP and MLME-SAP, the second switch having echo suppression 6a and the third data link unit 6b are connected to one another via a second management unit 7b. Furthermore, the known interface SPLME-SAP connects the third data link unit 6b to the third physical transmission unit 6c.

If, for example, the first and the second network unit 3a, c do not have common coverage at the radio end, they are now connected to one another by means of an optical fiber as connection structure 5 based on a Low Rate Wireless Personal Area Network. To couple the two network units 3a, c, the first management unit 7a and the second management unit 7b initially exchange address data so that a communication can be provided.

Due to changes in the environment of the radio network (no more disturbances, interference, etc.) it may happen that, for example, the first and the second network unit 3a, c have common coverage at undetermined times at the radio end. If, however, these are already connected to one another via the connection structure 5, multiple reception of data packets may occur, to be specific when a data packet is to be sent from one network unit (3a or 3c) to all devices and objects present in the radio network (broadcast data) and, therefore, is sent by radio and also via the connection structure 5. In this case, the network unit (3a or 3c) would receive the mentioned data packet twice. This multiple reception of data packets does not occur in a network only based on radio (normal ZigBee network) and can lead to problems in the network unit (3a or 3c) and in higher-level units (3d or 3b) and thus to termination of the communication. To avoid this, a filter is inserted in the switch having echo suppression (4a, 6a) which detects and filters out such packets received several times so that the network unit (3c or 3a) only receives the data packet once.

Figure 2:
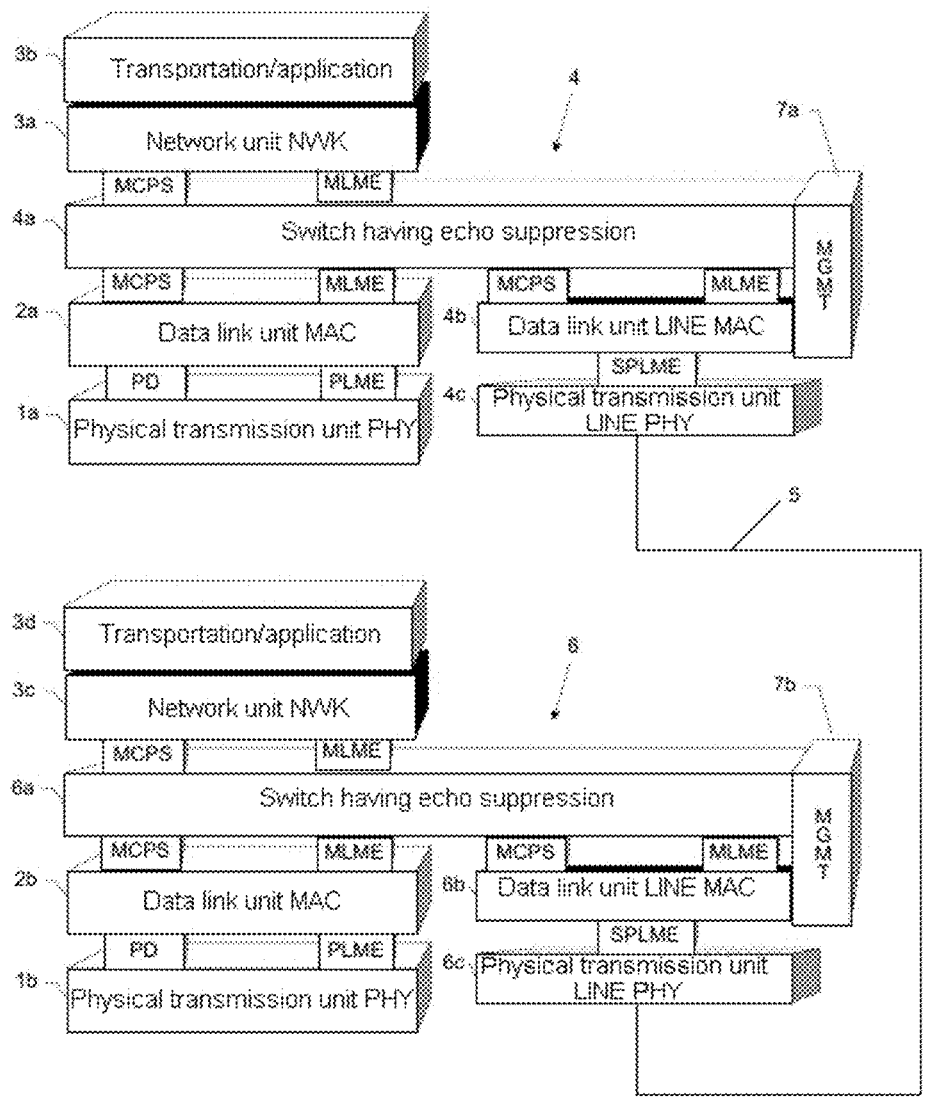
FIG. 2 shows a variant of the embodiment of the radio network according to the invention comprising a hard-wired connection structure (LINE)

A further embodiment according to the invention of the radio network in FIG. 2 differs from the embodiment in FIG. 1 only by the choice of connection structure 5 which is designed here as hard-wired connection. Correspondingly, the second and third data link units 4b, 6b (LINE MAC) and the second and third physical transmission units 4c, 6c (LINE PHY), respectively, are designed for hard-wired communication based on a Low Rate Wireless Personal Area Network via the connection structure 5.

Figure 3:
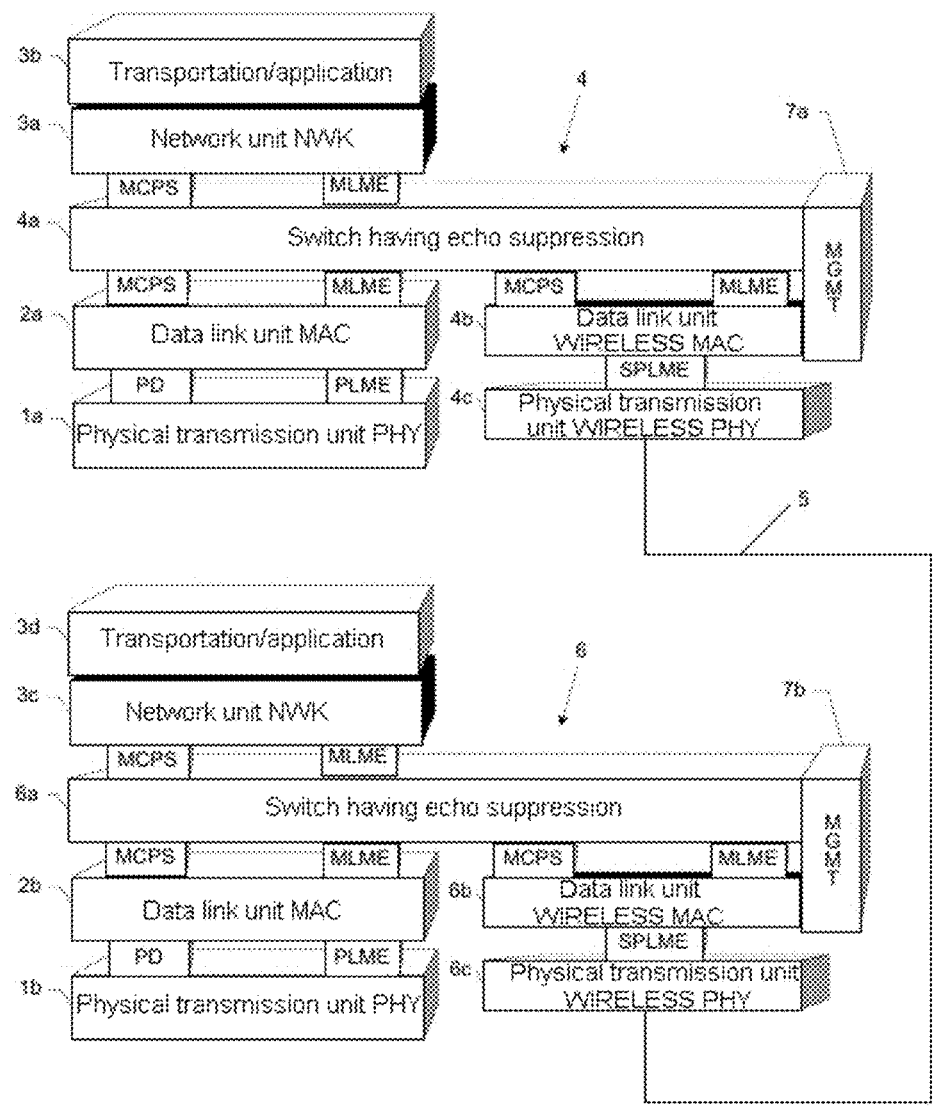
FIG. 3 shows a further variant of the embodiment of the radio network according to the invention comprising a connection structure based on radio technology (WIRELESS)

A further embodiment according to the invention of the radio network is shown in FIG. 3 which differs from the preceding embodiments only by the choice of the connection structure 5 which is designed here as a radio link based on a Low Rate Wireless Personal Area Network. In consequence, the second and third data link units 4b, 6b (WIRELESS MAC) and the second and third physical transmission units 4c, 6c (WIRELESS PHY) are designed for communication by radio via the connection structure 5.

Figure 4:
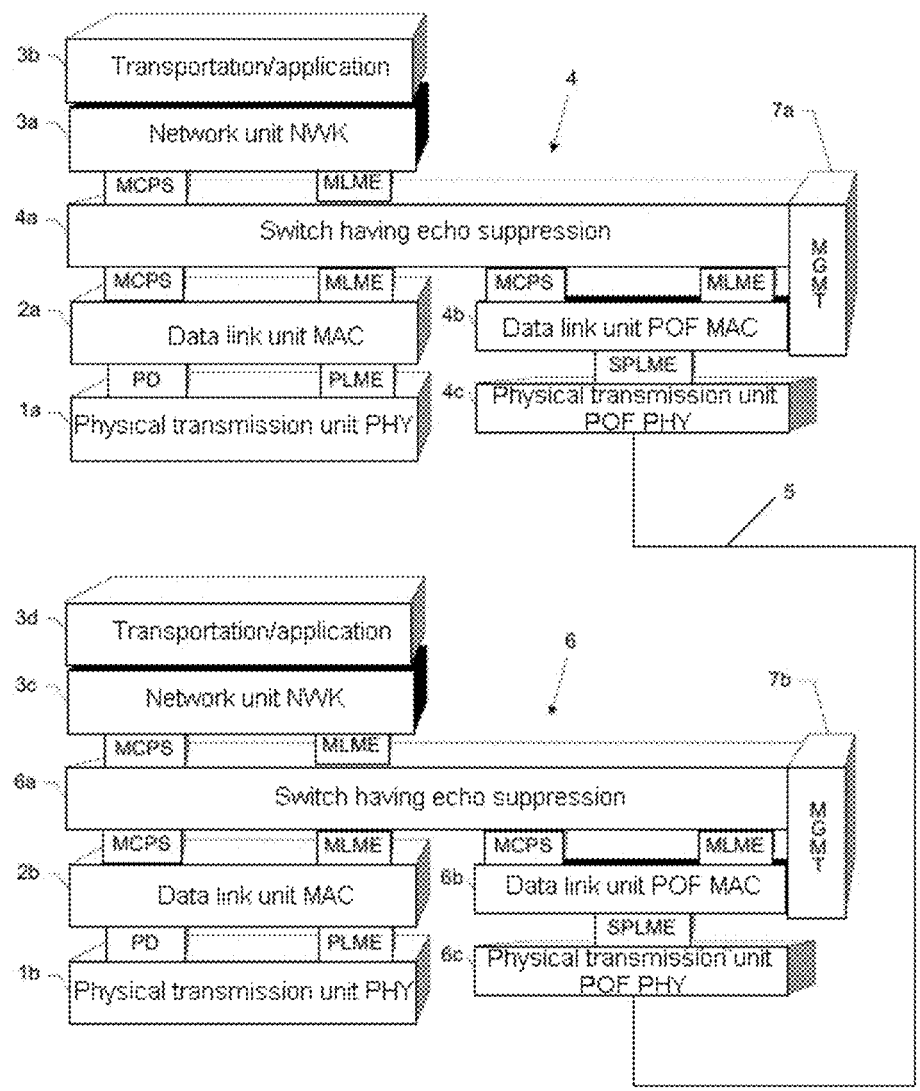
FIG. 4 shows a further variant of the embodiment of the radio network according to the invention comprising network units based on the ZigBee Standard according to IEEE 802.15.4 comprising a plastic optical fiber as connection structure.

With regard to the connection structure 5, FIG. 4 shows a further embodiment of the radio network according to the invention. The connection structure 5 is designed here as plastic optical fiber (POE) by means of which the second and third data link units 4b, 6b (POF MAC) and the second and third physical transmission units 4c, 6c (POF PHY) are designed for communication based on a Low Rate Wireless Personal Area Network via plastic optical fibers as connection structure 5.

Figure 5:
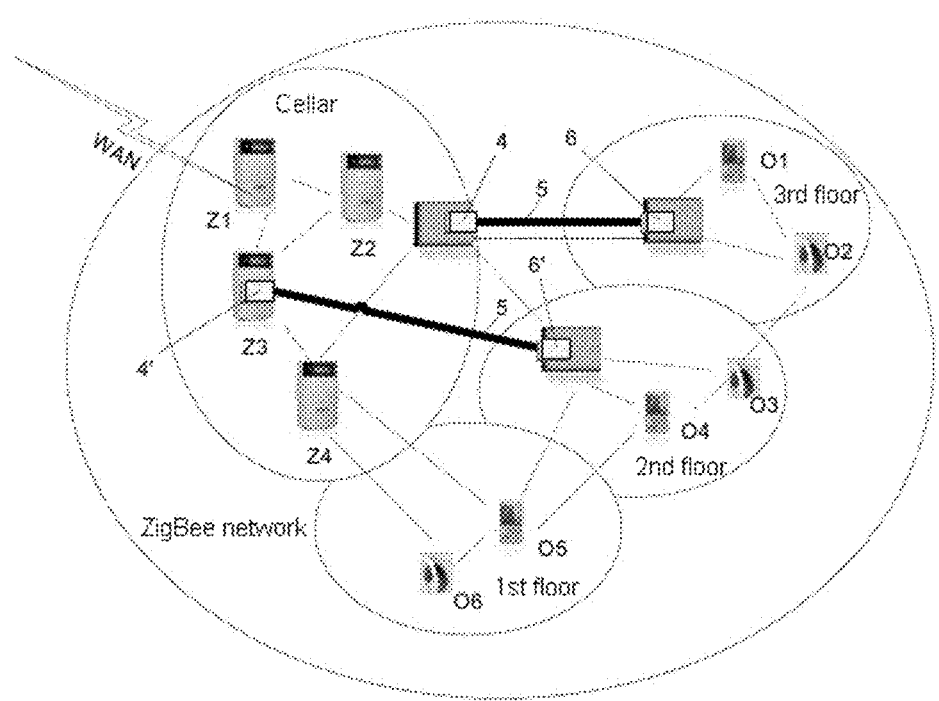
FIG. 5 shows a diagrammatic representation of a domestic installation of the radio network according to the invention.

FIG. 5 shows a domestic installation of the radio network according to the invention, in which loads O2, O3, O6 and display units O1, O4, O5, with power meters Z1, Z2, Z3, Z4 which are installed in a cellar, communicate with one another. To be able to distinguish the communication paths, two line thicknesses of the connecting lines have been selected; the thin connecting lines represent a radio communication based on a Low Rate Wireless Personal Area Network, for example according to ZigBee, and the thick connecting lines represent a communication also based on a Low Rate Wireless Personal Area Network, but via the connection structure 5 according to the invention. As can be seen in a simple manner, the display unit O1, for example, on the $5^{th}$ floor, does not have any direct radio link to a meter in the cellar; in contrast, this display unit O1 has an indirect connection via the network link 6, the connection structure 5 and the network link 4; the display unit O1 is thus also connected to the meters Z1-Z4. The load O2 on the $5^{th}$ floor also has the same connection with the power meters Z1-Z4 in the cellar; furthermore, load O2 can also communicate via a ZigBee radio communication and a further network link 6' directly with the meter Z3 via a connection structure 5, this meter Z3 also being equipped with a network link 4'.

What is claimed is:

1. A radio network having a Low Rate Wireless Personal Area Network, comprising:
    a first physical transmission unit and a first data link unit connected thereto;
    a first network unit connected to the first data link unit; and
    a first network link located between the first data link unit and the first network unit, the first network link having a first switch with echo suppression connected on a basis of the Low Rate Wireless Personal Area Network via a connection structure to a second network link and a second switch having echo suppression based on the Low Rate Wireless Personal Area Network, the connection structure connecting a second network unit to the first network unit for communication based on the Low Rate Wireless Personal Area Network.

2. The radio network as claimed in claim 1, wherein the connection structure comprising the first and the second network link represents, in relation to a radio transmission range between the first and the second network units, a remote connection between the first and the second network units based on the Low Rate Wireless Personal Area Network, this remote connection exceeding a maximum radio transmission range.

3. The radio network as claimed in claim 1, wherein the first network link, apart from the first switch having echo suppression, comprises a subsequent second data link unit connected to a second physical transmission unit.

4. The radio network as claimed in claim 3, wherein the second network link, apart from the second switch having echo suppression, comprises a subsequent third data link unit connected to a third physical transmission unit.

5. The radio network as claimed in claim 4, wherein the connection structure is located between the second physical transmission unit and the third physical transmission unit of the first and the second network link, respectively.

6. The radio network as claimed in claim 5, further comprising:
    a first management unit between the first switch having echo suppression and the second data link unit; and
    a second management unit located between the second switch having echo suppression and the third data link unit, wherein the first management unit and the second management unit are configured for an initial address data exchange for coupling the first and the second network links.

7. The radio network as claimed in claim 1, wherein the connection structure is configured bidirectionally as a wire link, a radio link, an optical fiber link, and/or a plastic optical fiber.

8. The radio network as claimed in one of the preceding claims, wherein the network units are designed in accordance with the ZigBee Standard.

9. A method for operating a radio network having a low power consumption, including a first physical transmission unit and a first data link unit connected to the first physical transmission unit and to a first network unit, comprising:
    using a first network link to communicate with a second network link via a connection structure for communication based on a Low Rate Wireless Personal Area Network, such that a second network unit is connected to the first network unit, the first network link connected between the first data link unit and the first network unit, the first network link having a first switch with echo suppression connected on a basis of the Low Rate Wireless Personal Area Network via the connection structure to a second network link and a second switch having echo suppression based on the Low Rate Wireless Personal Area Network.

10. The method as claimed in claim 9, wherein the first and the second network link have a first and a second management unit, respectively, and the method further comprises:
    exchanging address data for coupling the first and the second network units with the first and the second management units.

* * * * *